Sept. 24, 1946.     H. R. HARRISON     2,408,309
PORTABLE MOUNTING FOR ELECTRIC SWITCHES
Filed April 24, 1944     2 Sheets-Sheet 2
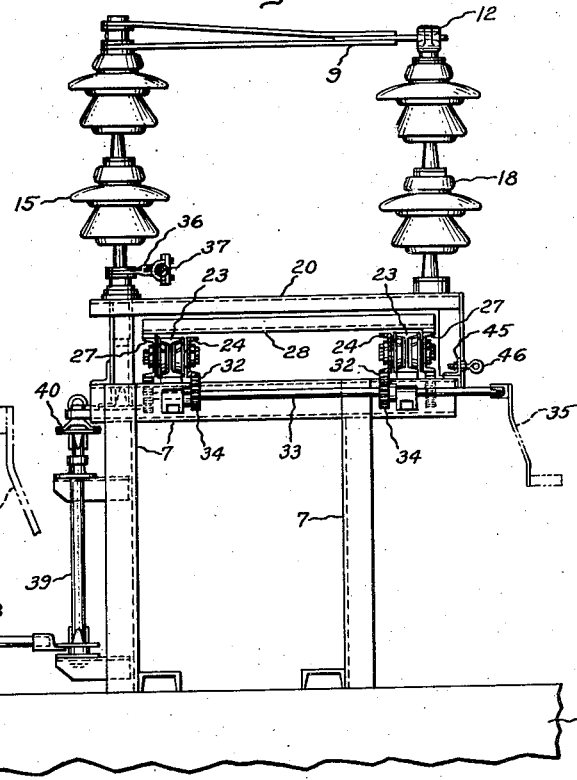
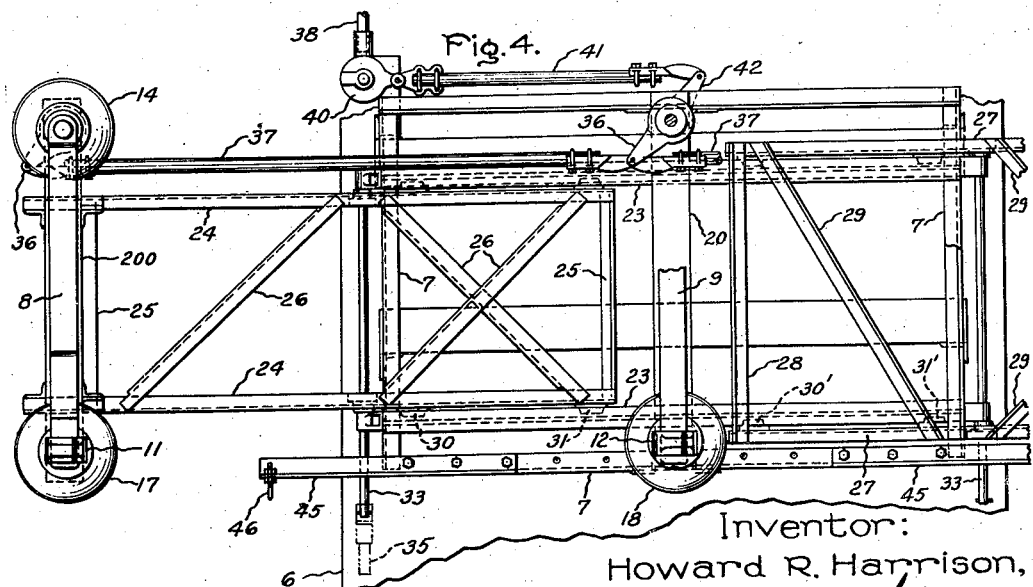
Inventor:
Howard R. Harrison,
by Harry E. Dunham
His Attorney.

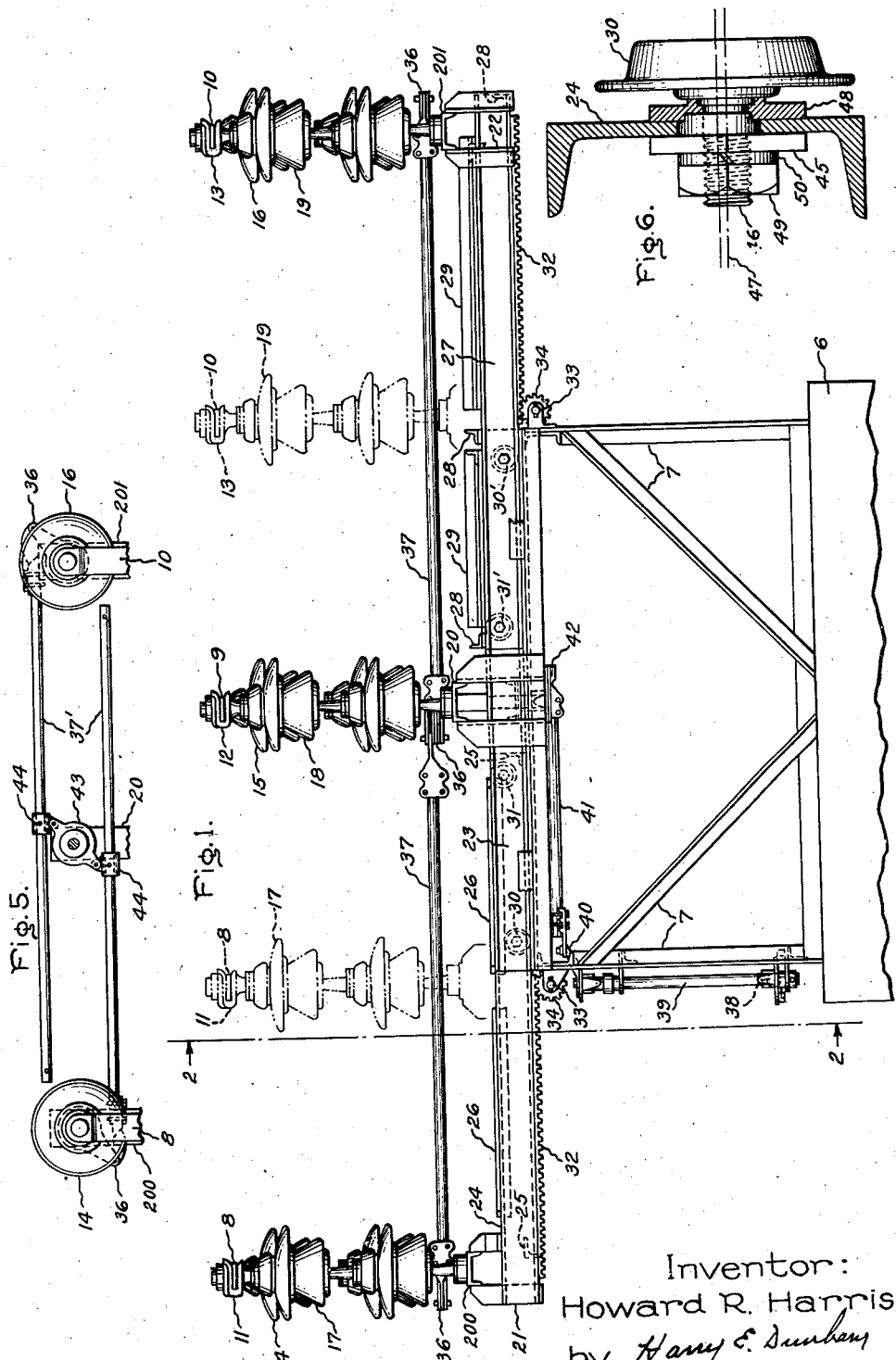

Patented Sept. 24, 1946

2,408,309

UNITED STATES PATENT OFFICE 2,408,309

PORTABLE MOUNTING FOR ELECTRIC SWITCHES

Howard R. Harrison, Upper Darby, Pa., assignor to General Electric Company, a corporation of New York Application April 24, 1944, Serial No. 532,431

12 Claims. (Cl. 200—168)

My invention relates to improvements in portable mountings for electric switches and more particularly for multipole electric switches which require greater electrical and sometimes also greater mechanical clearances between the respective poles when the switches are to be used in a given operating location than is available during transportation of the switches to the operating location.

Portable power plants, substations and the like have proven their value by providing electric service not only during emergencies arising from bombings, storms, floods and the like, but also when shut-downs for maintenance of regular equipment are necessary without interruption of the much desired continuity of service. Obviously the value of such portable electric equipment depends materially on how readily it can be transferred to the desired operating location and placed in operation. The generally available means of transportation overland, such as trains and automotive vehicles, are of course limited to the railroads and highways. Consequently, such portable equipment involves a conflict of clearances since the limited clearances of railroads and highways are, in general, far too small for the electrical and mechanical clearances required under actual operating conditions. Any reasonably practical arrangement must therefore be not only conveniently and readily portable, but also must satisfy this conflict of clearances and yet be quickly and simply convertible from the transporting clearance condition to the operating clearance condition, and vice versa.

An object of my invention is to provide an improved portable mounting for electric switches which require, under operating conditions, greater electrical and mechanical clearances than are available during transportation of the switches. Another object of my invention is to provide for electric switches carried on a mobile base, such as a railway car, auto trailer or the like, an improved mounting with transportation clearances for the switch substantially the same as the clearances required for the mobile base. A still further object of my invention is to provide an improved portable mounting for electric switches and especially multipole switches such that upon arrival at a desired operating location the switches can be simply and quickly changed from the transporting clearance requirements to the operating clearance requirements. These and other objects of my invention will appear in more detail hereinafter.

In accordance with my invention, I provide an improved portable mounting for electric switches wherein the desired electrical and mechanical clearances, especially between the poles of a multipole switch, are obtained by moving the outside pole or poles athwart transversely of the mobile supporting base between an extended position a substantial distance beyond the sides of the base and a portable position substantially directly over the base. Also in accordance with my invention, I provide means which is readily adapted to be positioned to permit simultaneous operation of all the poles of a multipole switch in the extended position and to permit the transverse movement of the outside poles to the portable position.

My invention will be better understood from the following description when considered in connection with the accompanying two sheets of drawings, and its scope will be pointed out in the appended claims.

In the accompanying two sheets of drawings, Fig. 1 is a transverse elevation of an embodiment of my invention in a portable switch mounting for a three-pole rotary blade type disconnecting switch showing in full lines the outer poles in the extended position and the switch in the closed position, and in dotted lines the outer poles in the transporting or portable position; Fig. 2 is a sectional elevation on the line 2—2 of Fig. 1; Fig. 3 is a similar sectional elevation to a larger scale than in Fig. 2 of a part of the mechanism for effecting the transverse movement of the outer poles of the disconnecting switch; Fig. 4 is a top plan view of the embodiment of my invention shown in Fig. 1, the overhanging portion shown to the right of Fig. 1 being omitted; Fig. 5 is a top plan view of a modification of the interpole connecting linkage shown in Figs. 1 and 3; and Fig. 6 is a sectional elevation to an enlarged scale of an adjustable wheel mounting for use with my invention.

In the accompanying drawings, I have illustrated an embodiment of my invention in a portable switch mounting wherein the mobile base 6 of a transporting device such as a railway car, autotruck, trailer or the like, is provided with an upwardly extending framework 7. As shown, this framework extends athwart the base 6 and comprises suitable horizontal, vertical and inclined structural members, such as angles, channels and the like, which are suitably secured to each other to provide a rigid structure capable of supporting the desired switchgear during transportation and actual power operation without material deformation or yielding. The component frame members may be welded, riveted or otherwise suitably secured to each other. On top of the framework 7 a suitable height above ground, I mount an electric switch, which as shown is a three-pole disconnecting switch comprising three blade contacts 8, 9 and 10 and three respectively cooperating stationary contacts 11, 12 and 13. The blade contacts 8, 9 and 10 are carried by suitable insulators 14, 15 and 16, and the stationary contacts 11, 12 and 13 are supported by insulators 17, 18 and 19. All of these insulators are supported by the framework 7 in a manner hereinafter described.

In accordance with my invention, the middle pole of the switch is fixed relatively to the framework 7, but the other two or outside poles are supported on the framework for bodily movement athwart or transversely of the base 6 between an extended position with the two outside poles at a distance respectively beyond opposite sides of the base 6 sufficient to provide the necessary electrical and mechanical clearances, as shown in Fig. 1 in solid lines, and a portable position with the two poles directly over the base, as indicated by the dash-dot line position of the insulators 17 and 19 and certain associated parts. Thus, the insulator 15, which supports the blade contact 9 of the middle pole of the switch, is rotatably mounted on a cross frame member such as a channel 20 suitably supported on the transverse framework 7. Rigidly mounted on this channel 20 is the insulator 18 which supports the cooperating contact 12.

For moving the outside poles between the extended and portable positions, I provide suitable means, such as carriages 21 and 22, which are supported for movement on suitable trackway means such as I-beams 23 extending lengthwise of the framework 7 and supported on top thereof. The carriage 21 comprises two longitudinal structural members such as spaced channels 24 with their flanges facing. These channels are suitably cross braced by struts 25 and diagonals 26, all of which are shown as angles. A cross frame member, such as a channel 200, is suitably mounted at the outer ends of the carriage channels 24. On this channel 200, the insulator 14 is rotatably mounted and the insulator 17 rigidly mounted. The carriage 22 is similar to the carriage 21 and comprises two longitudinal structural members such as two spaced channels 27 with their webs back to back. These channels are suitably cross braced by struts 28 and diagonals 29, all of which are shown as angles. A cross frame member such as a channel 201 is suitably supported on the carriage channels 27 at the outer ends thereof. On this cross channel member, the insulator 16 is rotatably mounted and the insulator 19 rigidly mounted.

In order that each of the carriages 21 and 22 may be moved transversely with a minimum of friction, tilting and binding, each carriage is provided with two spaced pairs of wheels, the wheels of one pair being in rolling engagement with the lower flanges of the I-beams 23 and the wheels of the other pair being in rolling engagement with the upper flanges of the I-beams 23. Thus, as will be more clearly apparent from Figs. 1, 2 and 3, there is rotatably mounted on each of the channels 24 of the carriage 21 at opposite intermediate points thereof a flanged wheel 30 having a tapered tread bearing on the inside lower flange of the associated I-beam 23. Also, there is rotatably mounted on each of the channels 24 at points near the inner ends thereof a flanged wheel 31 having a tapered tread bearing on the inside upper flange of the associated I-beam 23. The diameter of the tread of the wheels 30 and 31 is materially less than the distance between the inside faces of the flanges of the I-beams 23, and the treads are tapered to match the slope of the flanges of the I-beam. The diameter of the flanges on the wheels 30 and 31 is such that these flanges can bear only on the outer edge of the I-beam flange on which they roll. In like manner, the channels 27 of the carriage 22 are provided with wheels 30' and 31' except that these roll on the outside flanges of the I-beams 23. Since the channels 24 and 27 are respectively mounted inside and outside of the I-beams 23, neither carriage interferes with the transverse movement of the other.

In order to effect the transverse movement of the carriages 21 and 22, I provide suitable actuating means which, as shown, comprises a rack 32 secured to the lower flange of each of the channels 23 and 27 and a pinion drive comprising an axle 33 rotatably supported on the frame 7 and carrying two gears 34 in mesh with the racks on the respectively associated channels, the spacing of the gears 34 corresponding, of course, to that of the channels 24 and 27. For rotating the axles 33, a removable clutch type crank 35 is provided.

For simultaneous circuit controlling operation of all poles of the switch when the outer poles are in the extended position, each of the rotatable insulators 14, 15 and 16 is provided with a crank 36, and these are interconnected by suitable pin connected pipe links 37 when the carriages 21 and 22 are racked out to their respective extended positions. With the links 37 in place as shown in Figs. 1, 2 and 4, operation of the switch is effected by any suitable mechanism mounted on the frame 7 and herein illustrated as comprising a handle lever 38, a vertical shaft member 39 carrying a crank 40, and a coupling link 41 between the crank 40 and a crank 42 rigidly associated with the rotating insulator 15.

With the arrangement shown in Figs. 1, 2 and 4, it is necessary to remove the pipe links 37 before the equipment can be placed in the portable condition. In order to avoid this, I may provide a simpler means as illustrated in Fig. 5. In this modification as my invention, the coupling links 37' are arranged slidably to engage a double crank 43 on the middle insulator 15. Thus, for example, this crank 43 is provided with pivoted cylindrical members 44 in which the links 37' can slide as the carriages 21 and 22 are racked in or out. In the extended position, pins inserted in registering holes in the slidably engageable members 37' and 44 serve to make the interpole operating connections effective.

In order to take care of incoming line connections, I provide, as shown in Fig. 4, on frame 7 for the outside phase conductors movably positioned strain insulator supports, such as angle bars 45 which can be bolted to the frame in the extended position shown, or in a portable position. Each of the supports 45 is provided with an eye 46 for holding the strain insulator. A similar eye, not shown, for the middle pole is mounted directly on the frame 7. When it is necessary to transport the switchgear equipment, the bolts holding the members 45 to the frame 7 are temporarily removed and the supports 45 rebolted to the frame through holes therein closer to the center so that the supports do not overhang the sides of the mobile base 6.

Assuming the parts positioned as shown in Figs. 1, 2 and 4, which illustrate the extended position of the equipment for power operating purposes, then the equipment may be prepared for transportation as follows: The connections to the strain insulator supports 45 are removed, these supports unbolted, moved inwardly and rebolted on the frame 7. The switch is closed, and then the pipe links 37 are removed and suitably stowed on the mobile base. The crank 35 is then applied first to one of the axles 33 and then to the other to rack in the respective carriages 21 and 22, which results in bringing the outside poles of the switch inboard directly over the mobile base with the outside poles positioned as indicated by the dash-dot lines shown in Fig. 1. The equipment is then in the portable position ready for transportation to any desired location where it may be placed in condition for operation by following the above-described operation in reverse order.

In order to be able to align the carriages 21 and 22 and also to compensate for manufacturing tolerances and variations, I provide an adjustable mounting for the flanged wheels 30, 30', 31 and 31'. As shown in Fig. 6, this mounting comprises an eccentric bushing 45 which has a cylindrical portion fitting snugly in a circular hole in the web of the channel 24 and an eccentric cylindrical hole for the axle 46 on which the wheel 30 is rotatably mounted. The axis of rotation of the wheel 30 is indicated by the dash-dot line 47, and the dash line parallel thereto passes through the center of the circular hole in the web of the channel 24. Centrally disposed on the axle 46 between the wheel 30 and the bushing 45 is an adapter 48 suitably arranged so that it cannot rotate relatively to the axle 46. This assembly is secured to the web of the channel 24 by a nut 49 threaded on the axle 46 against a lock washer 50. The position of the axis of the wheel 30 can readily be changed by loosening the clamping nut 49 and turning the eccentric bushing 45 the desired amount. The nut 49 is then tightened to maintain the parts in their respective positions.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In a portable switch mounting wherein a transporting device is provided with a framework extending athwart the device in a direction substantially perpendicular to the direction of movement thereof; a switch, means supporting said switch on said framework for bodily movement thereon athwart the device between an extended position a substantial distance beyond one side of the device for electric current conducting purposes and a portable position closer to the side of the device for transportation clearance purposes, and means adapted to be operated to effect said bodily movement of the switch.

2. In a portable switch mounting wherein a transporting device is provided with a framework extending athwart the device in a direction substantially perpendicular to the direction of movement thereof; a switch, means supporting said switch for bodily movement athwart the device comprising a trackway supported by the framework and extending lengthwise thereof, a carriage supported for movement on said trackway and movable in one direction to support said switch in an extended position a substantial distance beyond one side of the device for electric current conducting purposes and in the opposite direction to a portable position with the switch closer to the side of the device for transportation clearance purposes, and means adapted to be operated to move said carriage.

3. In a portable switch mounting wherein a transporting device is provided with a framework extending athwart the device in a direction substantially perpendicular to the direction of movement thereof; a three-pole switch having one pole mounted on said framework substantially at the center thereof, means supporting the other two poles of said switch on said framework for bodily movement athwart the device between an extended position with the two poles a substantial distance respectively beyond opposite sides of the device for electric current conducting purposes and a portable position with the two poles closer to the sides of the device for transportation clearance purposes, means adapted to be operated to effect the bodily movement of said other two poles, and means interconnecting all the poles of said switch for simultaneous circuit controlling operation when said other two poles are in the extended position.

4. In a portable switch mounting wherein a transporting device is provided with a framework extending athwart the device in a direction substantially perpendicular to the direction of movement thereof; a three-pole switch having one pole mounted on said framework substantially at the center thereof, means supporting the other two poles of said switch on said framework for bodily movement athwart the device comprising a trackway supported by the framework and extending lengthwise thereof, two carriages supported for movement on said trackway and respectively carrying said other two switch poles movable in opposite directions to support said two poles respectively in an extended position a substantial distance beyond the sides of the device for electric current conducting purposes and reversely movable to a portable position with said two poles closer to the sides of the device for transportation clearance purposes, means adapted to be operated to actuate said carriages, and means interconnecting all the poles of said switch for simultaneous circuit controlling operation when the carriages are in the extended position.

5. In a portable switch mounting wherein a transporting device is provided with a framework extending athwart the device in a direction substantially perpendicular to the direction of movement thereof; a switch comprising three circuit controlling members, one of said members being mounted on said framework substantially centrally thereof for rotation in a horizontal plane, means supporting the other two of said members on said framework for bodily movement athwart the device between an extended position with the two members a substantial distance respectively beyond opposite sides of the device for electric current conducting purposes and a portable position with the members adjacent the sides of the device for transportation clearance purposes, said other two members being mounted on said supporting means for rotation in the same horizontal plane as said one member, means adapted to be operated to effect the bodily movement of said other two circuit controlling members, and means for simultaneously rotating all of said circuit controlling members when said other two members are in the extended position including means adapted to be positioned to permit the simultaneous rotation of all of the members when said other two members are in the extended position and to permit the bodily movement of said other two members.

6. In a portable switch mounting wherein a transporting device is provided with a framework extending athwart the device in a direction substantially perpendicular to the direction of movement thereof; a switch comprising three insulators, one of said insulators being rotatably mounted on said framework substantially centrally thereof, means supporting the other two of said insulators on said framework for bodily movement athwart the device between an extended position for electric current conducting purposes with the two insulators a substantial distance respectively beyond opposite sides of the device and a portable position with the two insulators adjacent the sides of the device for transportation clearance purposes, said other two insulators being rotatably mounted on said supporting means, means adapted to be operated to effect the bodily movement of said other two insulators, crank means respectively associated with each of said insulators, means interconnecting all of said insulators for simultaneous rotation when said other two insulators are in the extended position comprising means respectively connected to the crank means of each of said other two insulators and slidably engageable with the crank means of said one insulator and means for preventing the sliding engagement of said connecting means when the other two insulators are in the extended position, and means for rotating said one insulator.

7. In a portable mounting for a multipole electric switch, a supporting framework comprising relatively movable members, certain of the poles of said switch being respectively mounted on said members for movement therewith, and means for effecting relative movement of said members whereby to move their associated switch poles between an operative extended position for electric current conducting purposes and a retracted position for transportation clearance purposes.

8. In a portable mounting for a multipole electric switch, a supporting structure comprising a pair of substantially parallel spaced I-beams, a first carriage comprising two substantially parallel spaced members movably supported on the outside flanges of said I-beams, and a second carriage comprising two substantially parallel spaced members movably supported on the inside flanges of said I-beams, the spacing of the members of said carriages being such that neither carriage interferes with the movement of the other.

9. In a portable mounting for a multipole electric switch, a supporting structure comprising a trackway, two carriages respectively carrying two poles of said switch and respectively movably supported on the inside and outside of said trackway for telescoping action in the portable position of said two poles, and means for moving said carriages to and from each other.

10. In a portable mounting for a multipole electric switch, a variable width structure comprising a rigid framework and means supporting certain of the poles of said switch on said framework for movement to and from each other including a trackway supported by said framework, two carriages movably supported on said trackway, said carriages respectively carrying two poles of said switch, and means for moving said carriages away from each other to support said two switch poles in an extended operative position and toward each other to support said poles in a retracted portable position.

11. In a portable mounting for a multipole electric switch, a supporting structure comprising two substantially parallel spaced I-beams, a first carriage comprising two substantially parallel spaced members and two wheels rotatably mounted on each of said members respectively to engage the upper and lower outside flanges of said I-beams, and a second carriage comprising two substantially parallel spaced members and two wheels rotatably mounted on each of said members respectively to engage the upper and lower inside flanges of said I-beams, the spacing of the members of said carriages being such that neither carriage interferes with the movement of the other.

12. In a portable mounting for electrical apparatus wherein a transporting device is provided with a framework extending athwart the device in a direction substantially perpendicular to the direction of movement thereof; means supporting said apparatus on said framework for bodily movement thereon athwart the device between an extended position a substantial distance beyond one side of the device for electric current conducting purposes and a portable position closer to the side of the device for transportation clearance purposes, and means adapted to be operated to effect said bodily movement of the apparatus.

HOWARD R. HARRISON.